United States Patent
Misawa

(10) Patent No.: US 10,886,788 B2
(45) Date of Patent: Jan. 5, 2021

(54) POWER TRANSFER DEVICE AND POWER TRANSFER SYSTEM

(71) Applicant: Toyota Jidosha Kabushiki Kaisha, Toyota (JP)

(72) Inventor: Takahiro Misawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 181 days.

(21) Appl. No.: 15/808,317

(22) Filed: Nov. 9, 2017

(65) Prior Publication Data
US 2018/0152057 A1    May 31, 2018

(30) Foreign Application Priority Data
Nov. 30, 2016  (JP) .................................. 2016-232394

(51) Int. Cl.
| | |
|---|---|
| *G06T 7/70* | (2017.01) |
| *H02J 50/12* | (2016.01) |
| *H04N 7/18* | (2006.01) |
| *H02J 50/60* | (2016.01) |
| *B60L 53/122* | (2019.01) |
| *B60L 53/124* | (2019.01) |
| *B60L 53/126* | (2019.01) |

(Continued)

(52) U.S. Cl.
CPC ........... *H02J 50/60* (2016.02); *B60L 53/122* (2019.02); *B60L 53/124* (2019.02); *B60L 53/126* (2019.02); *G06T 7/70* (2017.01); *H02J 50/12* (2016.02); *H02J 50/80* (2016.02); *H04N 7/183* (2013.01); *H02J 7/025* (2013.01)

(58) Field of Classification Search
USPC .................................................. 307/9.1, 10.1
See application file for complete search history.

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |
| 2013/0257168 A1 | 10/2013 | Singh |

(Continued)

FOREIGN PATENT DOCUMENTS

| | | |
|---|---|---|
| EP | 2779359 A2 | 9/2014 |
| JP | 2013110822 A | 6/2013 |

(Continued)

*Primary Examiner* — Rexford N Barnie
*Assistant Examiner* — Xuan Ly
(74) *Attorney, Agent, or Firm* — Dinsmore & Shohl LLP

(57) ABSTRACT

A power transfer device includes a power transfer part configured to contactlessly transfer power to a power reception part of a power reception device, a sensor configured to detect a foreign object that is present between the power transfer part and the power reception part, and a controller configured to control the power transfer part and the sensor. The controller is configured to execute initial learning that learns an initial state of a detection result of the sensor before initiation of foreign object detection using the sensor. The controller is configured to determine presence of the foreign object by using a difference between the initial state and the detection result of the sensor after execution of the initial learning. The controller is configured to control the power transfer part to reduce power to be transferred to the power reception part when the initial learning is not normally executed.

6 Claims, 6 Drawing Sheets

(51) Int. Cl.
  *H02J 50/80* (2016.01)
  *H02J 7/02* (2016.01)

(56) References Cited

U.S. PATENT DOCUMENTS

| | | | |
|---|---|---|---|
| 2014/0111019 A1* | 4/2014 | Roy | H02J 7/025 |
| | | | 307/104 |
| 2014/0184150 A1 | 7/2014 | Walley | |
| 2015/0008877 A1 | 1/2015 | Ichikawa et al. | |
| 2015/0263532 A1 | 9/2015 | Van Wageningen | |
| 2016/0149440 A1 | 5/2016 | Staring et al. | |
| 2016/0187519 A1 | 6/2016 | Widmer et al. | |
| 2017/0093214 A1 | 3/2017 | Watanabe et al. | |

FOREIGN PATENT DOCUMENTS

| | | | |
|---|---|---|---|
| JP | 2013126327 A | 6/2013 |
| JP | 2013146148 A | 7/2013 |
| JP | 2013146154 A | 7/2013 |
| JP | 2013154815 A | 8/2013 |
| JP | 2015008550 A | 1/2015 |
| JP | 2017070074 A | 4/2017 |
| WO | 2014063159 A2 | 4/2014 |
| WO | 2015144389 A1 | 10/2015 |

\* cited by examiner

POWER TRANSFER DEVICE AND POWER TRANSFER SYSTEM

CROSS-REFERENCE TO RELATED APPLICATION(S)

This application claims priority to Japanese Patent Application No. 2010-232394 filed on Nov. 30, 2016, the entire contents of which is incorporated herein by reference.

BACKGROUND

1. Technical Field

The present disclosure relates to a power transfer device and a power transfer system, and particularly relates to a power transfer device contactlessly transferring power to a power reception device, and a power transfer system including the power transfer device.

2. Description of Related Art

A power transfer system that contactlessly transfers power from a power transfer device to a power reception device is known (refer to, for example, Japanese Unexamined Patent Application Publication No. 2015-8550 (JP 2015-8550 A)). Regarding such a power transfer system, a contactless charging device including an electrostatic capacitive detection sensor that detects the presence of a foreign object between a power supply device (power transfer device) and a power reception device is disclosed in JP 2015-8550 A. The contactless charging device stores an initial value (initial state) of a sensor output and determines the presence of a foreign object based on a change from the initial value to a detected value (refer to JP 2015-8550 A).

SUMMARY

When a foreign object is already present between the power transfer device and the power reception device at the time of measurement of the initial value, there is no change between the initial value and the detected value in the presence of the foreign object, and the contactless charging device disclosed in JP 2015-8550 A may determine that a foreign object is not present. Such a situation may occur when, for example, the initial value is cleared by occurrence of a power outage and is measured in a state where a foreign object is present between the power transfer device and the power reception device at the time of recovery from the power outage. When a large amount of power is transferred to the power reception device from the power transfer device even in the presence of the foreign object, a magnetic field that is generated along with the power transfer may affect the foreign object and, for example, increase the temperature of the foreign object.

The disclosure provides a power transfer device contactlessly transferring power to a power reception device, and a power transfer system including the power transfer device, the power transfer device and the power transfer system being capable of suppressing transfer of a large amount of power to the power reception device from the power transfer device even in the presence of a foreign object between the power transfer device and the power reception device.

A first aspect relates to a power transfer device including a power transfer part, a sensor, and a controller. The power transfer part is configured to contactlessly transfer power to a power reception part of a power reception device. The sensor is configured to detect a foreign object that is present between the power transfer part and the power reception part. The controller is configured to control the power transfer part and the sensor. The controller is configured to execute initial learning that learns an initial state of a detection result of the sensor before initiation of foreign object detection using the sensor. The controller is configured to determine presence of the foreign object by using a difference between the initial state and the detection result of the sensor after execution of the initial learning. The controller is configured to control the power transfer part to reduce power to be transferred to the power reception part when the initial learning is not normally executed.

A second aspect relates to a power transfer system including the power transfer device and a power reception device. In the first and second aspects, the controller may be configured not to allow power to be transferred to the power reception part from the power transfer part when the initial learning is not normally executed.

The first and second aspects reduce (or do not allow) transfer of power to the power reception part from the power transfer part when the initial learning that learns the initial state of the detection result of the sensor is not normally executed. Thus, the first and second aspects can suppress transfer of a large amount of power to the power reception device from the power transfer device without detection of a foreign object regardless of the presence of the foreign object. Therefore, the first and second aspects may reduce a rise in the temperature of the foreign object due to transfer of a large amount of power to the power reception device from the power transfer device without detection of the foreign object regardless of the presence of the foreign object.

In the first and second aspects, the power transfer device may further include an input part configured to receive an instruction to execute the initial learning from a user. The controller may execute the initial learning when the input part receives the instruction from the user. The first and second aspects can certainly reduce automatic execution of the initial learning regardless of the presence of the foreign object. That is, the initial learning can be executed after the user confirms that a foreign object is not present. Therefore, the power transfer device can execute the initial learning in a situation where a foreign object is certainly not present.

In the first and second aspects, the power reception device may be mounted in a vehicle. The controller may be configured to execute the initial learning after completion of a pairing process that associates the vehicle with the power transfer device.

The first and second aspects reduce power to be transferred to the power reception part even after completion of the pairing process when the initial learning is not normally executed. Therefore, the power transfer device can reduce transfer of a large amount of power to the power reception device from the power transfer device without detection of the foreign object regardless of the presence of the foreign object.

In the first and second aspects, the power transfer device may further include a notification part. The notification part is configured to notify the user that power transferred to the power reception part from the power transfer part is reduced due to a face that the initial learning is not normally executed.

The first and second aspects enable the user to understand the reason why power to be transferred to the power reception part from the power transfer part is reduced (recognize that the initial learning is not normally executed).

In the first and second aspects, the sensor may include at least one of a camera configured to capture a space between the power transfer part and the power reception part and an abnormality detection coil configured to output a different output voltage depending on the presence of the foreign object.

The first and second aspects can suppress, in a power transfer device contactlessly transferring power to a power reception device and a power transfer system including the power transfer device, transfer of a large amount of power to the power reception device from the power transfer device without detection of a foreign object regardless of the presence of the foreign object between the power transfer device and the power reception device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
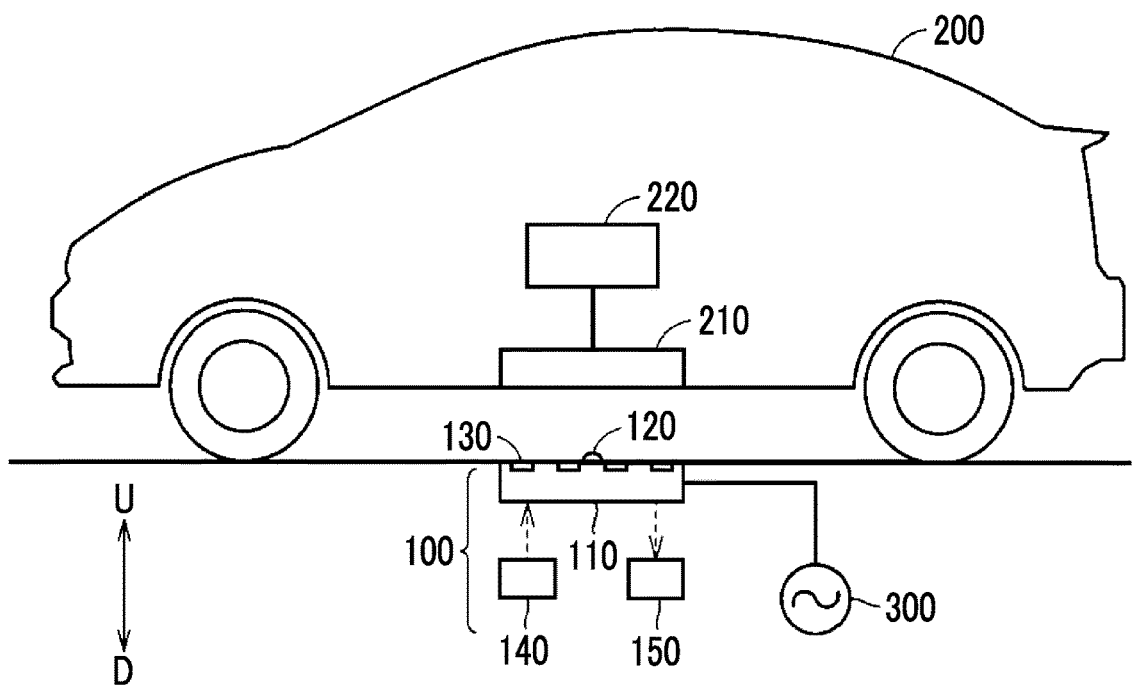
FIG. 1 is a schematic configuration diagram of a power transfer system to which a power transfer device according to an embodiment is applied.

Hereinafter, an embodiment will be described in detail with reference to the drawings. The same or corresponding parts in the drawings will be designated by the same reference signs and will be described once.

FIG. 1 is a schematic configuration diagram of a power transfer system to which a power transfer device 100 according to the embodiment is applied. In FIG. 1, an arrow D denotes a vertically downward direction, and an arrow denotes a vertically upward direction. In FIG. 1, the power transfer system includes the power transfer device 100 and a vehicle 200. The power transfer device 100 includes a power transfer unit 110, an input part 140, and a notification part 150. The vehicle 200 includes a power reception unit 210 and a power storage device 220.

The power transfer unit 110 includes a power transfer part not illustrated (described below), a camera 120, and a plurality of foreign object detection coils 130. The power transfer part receives power supplied from an alternating current power source 300 (for example, a commercially available system power source). The power transfer part is configured to contactlessly transfer power to a power reception part (not illustrated) included in the power reception unit 210 through a magnetic field in a state where the vehicle 200 is positioned such that the power reception unit 210 of the vehicle 200 faces the power transfer unit 110.

The camera 120 and the foreign object detection coils 130 are sensors that detect the presence of a foreign object between the power transfer unit 110 and the power reception unit 210. That is, the camera 120 and the foreign object detection coils 130 are disposed as sensors detecting a foreign object in the embodiment. The foreign object is an object that should not be present between the power transfer unit 110 and the power reception unit 210. Examples of the foreign object include metal pieces, such as a beverage can and a coin, and animals.

The camera 120 includes a fisheye lens and is disposed on an approximately central portion of the upper surface of the power transfer unit 110. By including a fisheye lens, the camera 120 is configured to be capable of capturing a wide spatial area including a space between the power transfer unit 110 and the power reception unit 210. A captured image of the camera 120 can be used to detect the presence of a foreign object between the power transfer unit 110 and the power reception unit 210.

The foreign object detection coils 130 are disposed in, for example, a matrix shape on an inner casing side oaf the upper surface of the power transfer unit 110. When a foreign object is present on the power transfer unit 110, the output of the coil that is close to the foreign object among the foreign object detection coils 130 disposed in a matrix shape is changed. Thus, the presence of the foreign object on the power transfer unit 110 can be detected by monitoring the output of each foreign object detection coil 130. A configuration of the power transfer unit 110 including the camera 120 and the foreign object detection coils 130 will be described in more detail below.

A user uses the input part 140 to provide an instruction to execute initial learning before initiation of foreign object detection using the camera 120 and the foreign object detection coils 130 (hereinafter, collectively referred to as a "foreign object detection sensor"). The initial learning learns an initial state of a detection result of the foreign object detection sensor.

A specific method for foreign object detection using the camera 120 and a specific method for foreign object detection using the foreign object detection coils 130 will be described in more detail below. Any of the methods, basically, executes the initial learning before initiation of foreign object detection using the foreign object detection sensor and determines the presence of a foreign object by using the difference between the initial state and the detection result of the foreign object detection sensor after execution of the initial learning. The initial learning includes acquisition of the detection result (initial state) of the foreign object detection sensor in a state where a foreign object is not present between the power transfer unit 110 and the power reception unit 210. The input part 140 is disposed such that the initial learning is executed after the user confirms that a foreign object is not present between the power transfer unit 110 and the power reception unit 210.

As described below, the initial learning includes a process of confirming that a foreign object is not present between the power transfer unit 110 and the power reception unit 210. Thus, the input part 140 that is used to request the user to confirm the absence of a foreign object may not be provided. However, disposing the input part 140 can reduce a situation in which the initial learning is not normally executed due to the presence of a foreign object between the power transfer unit 110 and the power reception unit 210.

The notification part 150 notifies the user that power is not allowed to be transferred to the power reception unit 210 from the power transfer unit 110, when the initial learning is not normally executed. As described in more detail below, when the initial learning is not normally executed, a foreign object that is present between the power transfer unit 110 and the power reception unit 210 may not be detected. Thus, power is not allowed to be transferred to the power reception unit 210 from the power transfer unit 110. The notification part 150 notifies the user of such a situation. The notification part 150 may notify the user by display or may notify the user by audio.

The power reception unit 210 in the vehicle 200 includes the power reception part and a rectification part (none of which is illustrated). The power reception part is configured to contactlessly receive power from the power transfer part of the power transfer unit 110 through a magnetic field in a state where the vehicle 200 is positioned such that the power reception unit 210 faces the power transfer unit 110 of the power transfer device 100. The rectification part rectifies power (alternating current) received by the power reception part and outputs the rectified power to the power storage device 220.

The power storage device 220 is a rechargeable direct current power source and is configured to include a secondary cell such as a lithium-ion cell or a nickel-hydrogen cell. The power storage device 220 stores power that is output from the power reception unit 210. The power stored in the power storage device 220 is supplied to a traveling motor or the like not illustrated and is used for generation or the like of driving power for the vehicle 200. An electric double-layer capacitor or the like can also be employed as the power storage device 220.

Figure 2:
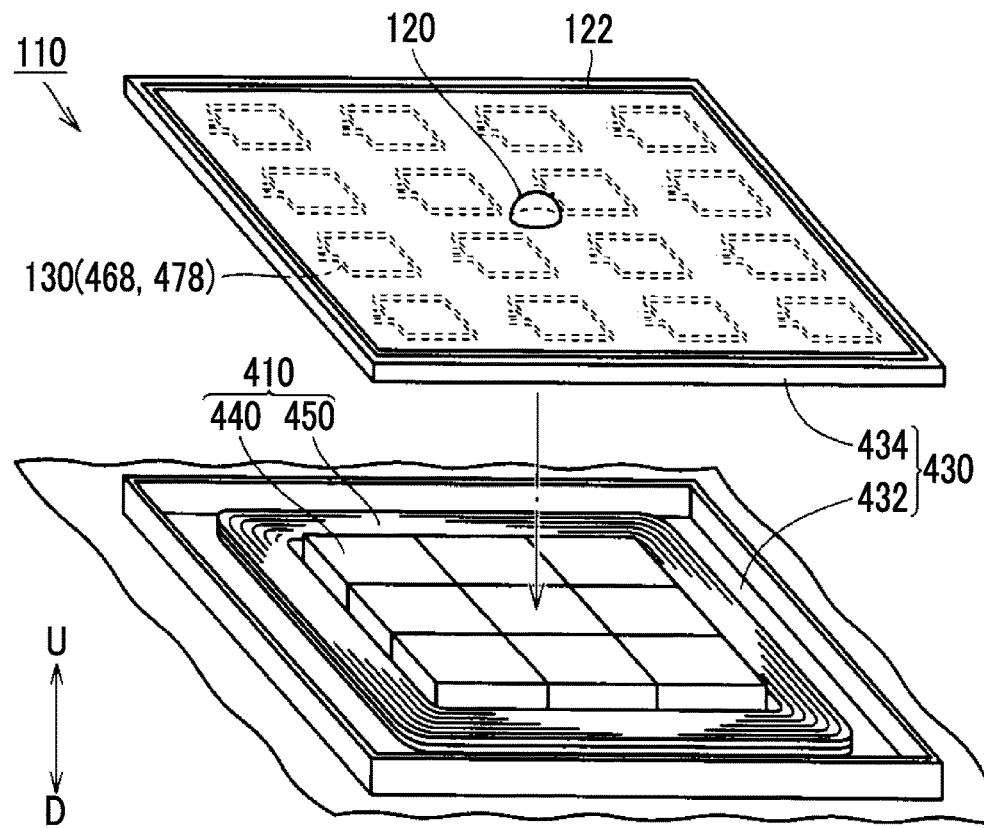
FIG. 2 is an exploded perspective view of a power transfer unit.

FIG. 2 is an exploded perspective view of the power transfer unit 110. In FIG. 2, the power transfer unit 110 includes a power transfer coil 410, a casing 430, the camera 120, a light source 122, and the foreign object detection coils 130.

The power transfer coil 410 includes a ferrite core 440 and a conductive wire 450 that is wound around the core 440. The conductive wire 450 may be disposed to be wound around the core 440. While not particularly illustrated, a capacitor that is connected to the power transfer coil 410 (conductive wire 450) to form a resonant circuit with the power transfer coil 410 is disposed in the power transfer unit 110. A Q factor that indicates the resonance strength of the resonant circuit may be greater than or equal to 100. The power transfer coil 410 is accommodated in the casing 430. The casing 430 includes a shield 432 and a cover member 434.

The camera 120 is disposed on an approximately central portion of the cover member 434. As described above, the camera 120 includes a fisheye lens and is configured to be capable of capturing a wide spatial area including the space between the power transfer unit 110 and the power reception unit 210. The light source 122 is disposed in a rectangular ring shape along the outer periphery of the cover member 434 on the upper surface of the cover member 434. The light source 122 is, for example, a light emitting diode (LED) and emits light radially inward of the ring such that the camera 120 can capture the light emitted from the light source 122.

The foreign object detection coils 130 are disposed on the upper surface of the power transfer unit 110. In the embodiment, the foreign object detection coils 130 are disposed in a matrix shape on an inner casing side of the cover member 434 constituting the upper surface of the casing 430. Each foreign object detection coil 130 is configured with a first coil 468 and a second coil 478. The first coil 468 and the second coil 478 have the same size and the same shape. The second coil 478 is disposed to face the first coil 468 and constitutes a coil pair with the first coil 468. By disposing the foreign object detection coils 130 having a smaller size than the exterior of the power transfer coil 410 in plural number on the upper surface of the power transfer unit 110, a small foreign object on the power transfer unit 110 can be detected.

Figure 3:
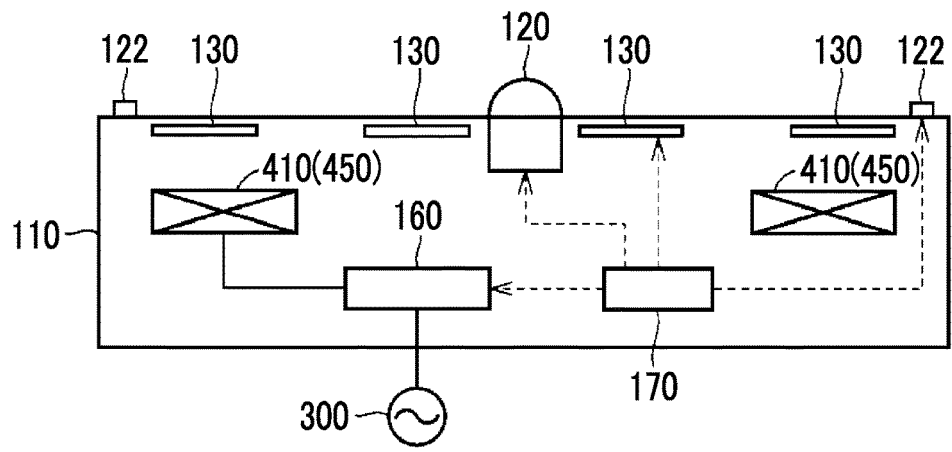
FIG. 3 is a schematic configuration diagram of the power transfer unit.

FIG. 3 is a schematic configuration diagram of the power transfer unit 110, in FIG. 3, as described above, the power transfer unit 110 includes the camera 120, the light source 122, the foreign object detection coils 130, and the power transfer coil 410. The power transfer unit 110 further includes a power source part 160 and a controller 170.

The power source part 160 receives power from the alternating current power source 300. The power source part 160 converts the power received from the alternating current power source 300 into transferred power having a predetermined frequency (for example, a few tens of kHz) and supplies the transferred power to the power transfer coil 410 in accordance with an instruction from the controller 170. The power source part 160, with the power transfer coil 410, constitutes the "power transfer part" that contactlessly transfers power to the power reception unit 210 (FIG. 1) through a magnetic field. The power source part 160 is configured to include, for example, a power factor correction (PFC) circuit, an inverter, and a noise filter.

The controller 170 includes a central processing unit (CPU), a storage device, input and output buffers, and the like (none of which is illustrated). The controller 170 controls power transfer to the power reception unit 210 by the power transfer part (the power source part 160 and the power transfer coil 410) and performs foreign object detection using the foreign object detection sensor (the camera 120, the light source 122, and the foreign object detection coils 130). Various processes executed by the controller 170 can be processed not only by software but also by dedicated hardware (electronic circuit).

Figure 4:
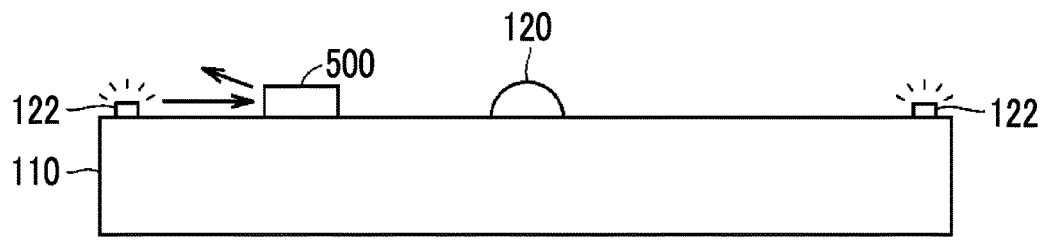
FIG. 4 is a diagram illustrating a method for detecting the presence of a foreign object on the power transfer unit by a camera.

FIG. 4 is a diagram illustrating a method for detecting the presence of a foreign object on the power transfer unit 110 by the camera 120. In FIG. 4, the controller 170 (FIG. 3) controls the light source 122 such that the light source 122 emits light. When a foreign object 500 is present on the power transfer unit 110, a part of the light emitted from the light source 122 is blocked by the foreign object 500. Thus, there is a difference in the captured image of the camera 120 between when the foreign object 500 is not present on the power transfer unit 110 and when the foreign object 500 is present on the power transfer unit 110.

The embodiment executes the initial learning before initiation of foreign object detection using the camera 120. The initial learning includes acquisition of the captured image (initial state) of the earners 120 in a state where a foreign object is not present between the power transfer unit 110 and the power reception unit 210. The embodiment determines the presence of a foreign object by using the difference between the captured image of the camera 120 in the initial state, that is, a state where a foreign object is not present, and the detection result of the camera 120 after execution of the initial learning, that is, the current captured image of the camera 120. The initial learning of the camera 120 includes not only acquisition of the captured image in a state where a foreign object is not present between the power transfer unit 110 and the power reception unit 210 but also correction and the like of distortions in the captured image.

Figure 5:
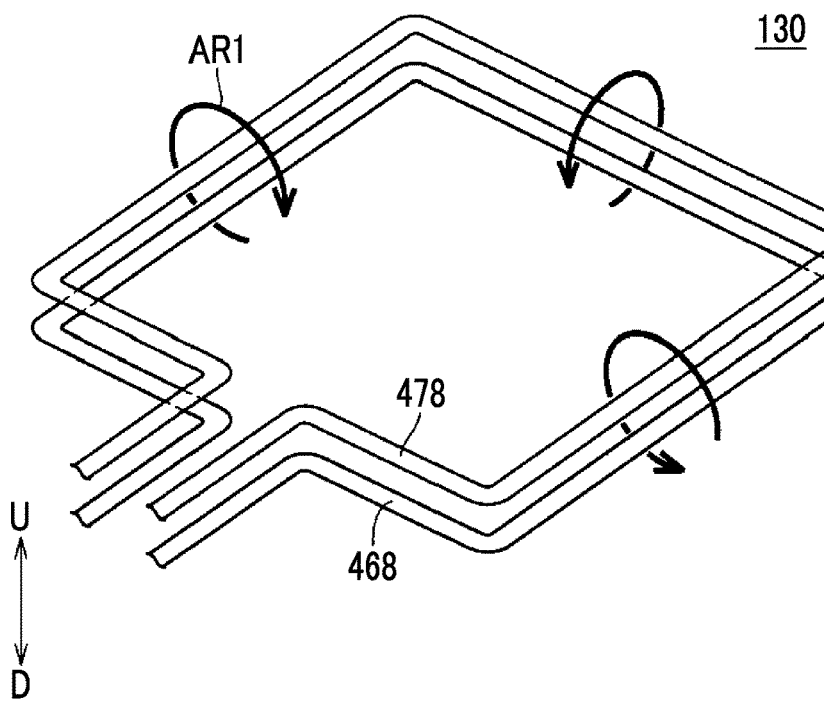
FIG. 5 is a diagram illustrating a method for detecting a foreign object by a foreign object detection coil.

FIG. 5 is a diagram illustrating a method for detecting a foreign object by each foreign object detection coil 130. In FIG. 5, each of the first coil 468 and the second coil 478 constituting each foreign object detection coil 130 has a rectangular shape. The second coil 478 is disposed to face the first coil 468. Such a configuration of a coil pair can be easily formed by, for example, patterning a metal conductive trace on both surfaces of a printed substrate.

When an alternating current detection voltage is applied to the first coil 468, the first coil 468 forms a detection magnetic field AR1. Then, the detection magnetic field AR1 generates an induced voltage in the second coil 478 that is disposed to face the first coil 468. When a foreign object is present near the coil pair, the foreign object affects the detection magnetic field AR1. Thus, a coupling coefficient between the first coil 468 and the second coil 478 is changed, and the state of power reception in the second coil 478 is changed. Thus, there is a difference in the output voltage of the second coil 478 between when a foreign object is not present on the power transfer unit 110 and when a foreign object is present on the power transfer unit 110.

The embodiment executes the initial learning before initiation of foreign object detection using the foreign object detection coils 130. The initial learning includes acquisition of the output voltage (initial state) of the foreign object detection coils 130 in a state where a foreign object is not present on the power transfer unit 110. The embodiment determines the presence of a foreign object by using the difference between the output of the foreign object detection coils 130 in the initial state, that is, a state where a foreign object is not present on the power transfer unit 110, and the detection result of the foreign object detection coils 130 after execution of the initial learning, that is, the current output of the foreign object detection coils 130. The initial learning of the foreign object detection coils 130 includes not only acquisition of the output of the foreign object detection coils 130 in a state where a foreign object is not present on the power transfer unit 110 but also execution or the like of a process (described below) for securing detection precision between the foreign object detection coils 130.

When a foreign object is already present between the power transfer unit 110 and the power reception unit 210 at the time of execution of the initial learning (the initial learning of the camera 120 and the initial learning of the foreign object detection coils 130), the initial learning is executed in the presence of the foreign object. Consequently, there is no difference between the sensor detected value in the presence of the foreign object and a learning result of the initial learning (the sensor detected value acquired in the initial learning) after execution of the initial learning, and the foreign object may not be determined to be present. When a large amount of power is transferred to the power reception unit 210 from the power transfer unit 110 regardless of the presence of the foreign object between the power transfer unit 110 and the power reception unit 210, a magnetic field that is generated along with the power transfer may affect the foreign object and, for example, increase the temperature of the foreign object.

The power transfer device 100 according to the embodiment does not allow power to be transferred to the power reception unit 210 from the power transfer unit 110 when the initial learning is not normally executed for the camera 120 and the foreign object detection coils 130. Accordingly, the power transfer device 100 can reduce transfer of a large amount of power to the power reception unit 210 from the power transfer unit 110 without detection of a foreign object regardless of the presence of the foreign object between the power transfer unit 110 and the power reception unit 210. Therefore, the power transfer device 100 may reduce a rise in the temperature of the foreign object due to transfer of a large amount of power to the power reception unit 210 from the power transfer unit 110 without detection of the foreign object regardless of the presence of the foreign object.

Figure 6:
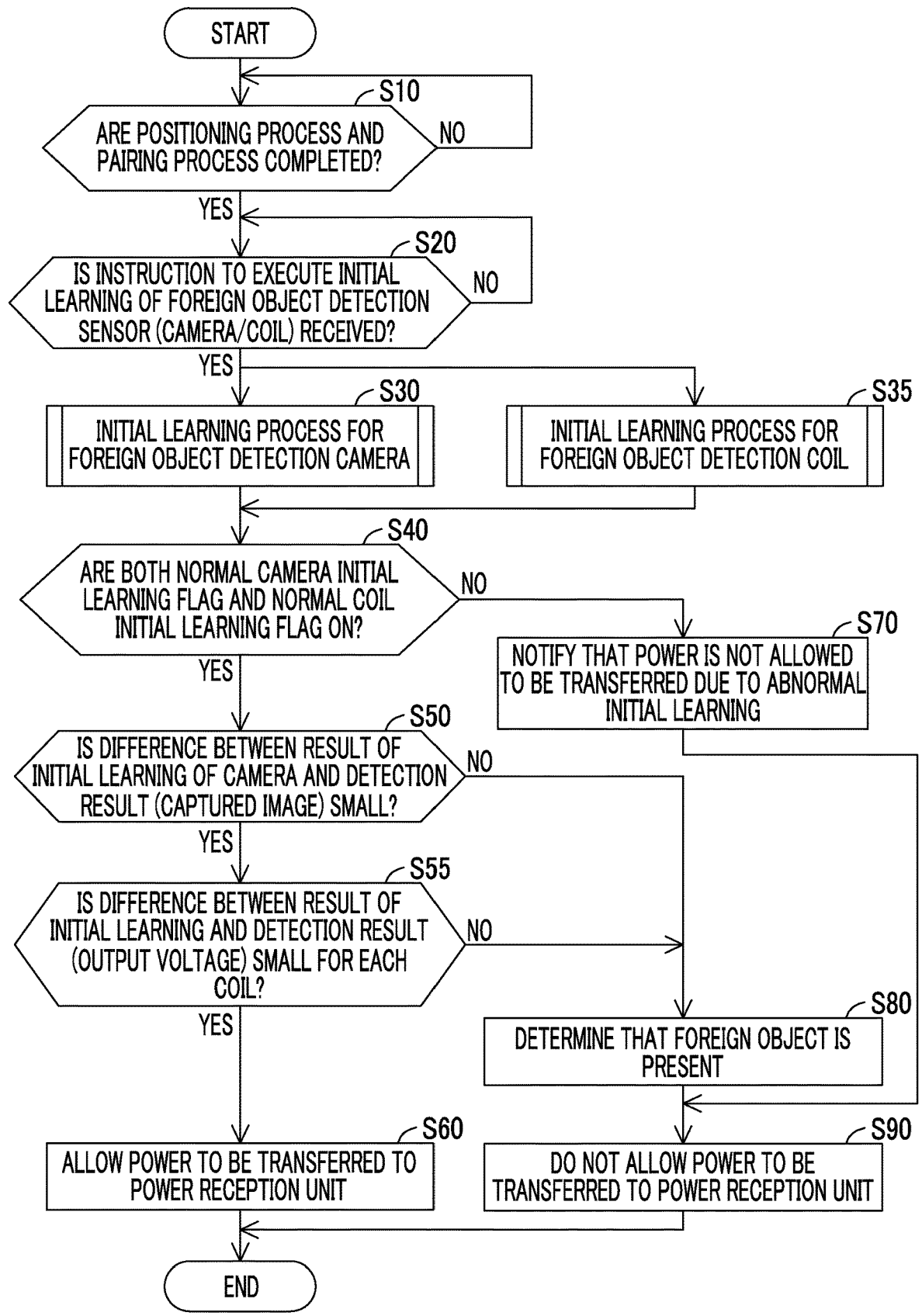
FIG. 6 is a flowchart illustrating a process related to foreign object detection executed by a controller illustrated in FIG. 3.

FIG. 6 is a flowchart illustrating a process related to foreign object detection executed by the controller 170 illustrated in FIG. 3. The process illustrated in the flowchart is executed when, for example, the power transfer device 100 is powered up.

In FIG. 6, the controller 170 determines whether or not a positioning process and a pairing process for the vehicle 200 with respect to the power transfer device 100 is completed (step S10). While not described in detail, positioning of the vehicle 200 with respect to the power transfer device 100 can be performed by using, for example, the camera 120. For example, a marker that can be captured by the camera 120 is disposed on a predetermined part of the lower surface of the power reception unit 210, and the image captured by the camera 120 is transmitted to the vehicle 200. Accordingly, the vehicle 200 can be operated such that the vehicle 200 is stopped in a position where the power reception unit 210 faces the power transfer unit 110.

The pairing process is associating the vehicle 200 with the power transfer device 100 after positioning of the vehicle 200 with respect to the power transfer device 100 is completed. When a parking space including the power transfer device 100 is disposed in plural number adjacent to each other, the pairing process is executed in order to link the vehicle 200 parked in a certain parking space with the power transfer device 100 of the parking space. In the pairing process, for example, low power that includes information specific to each power transfer device 100 (a smaller amount of power than the transferred power at the time of charging the power storage device 220 of the vehicle 200) is output from the power transfer part of each power transfer device 100, and the vehicle 200 recognizes the corresponding power transfer device 100 based on the information included in the low power received by the vehicle 200.

Figure 7:
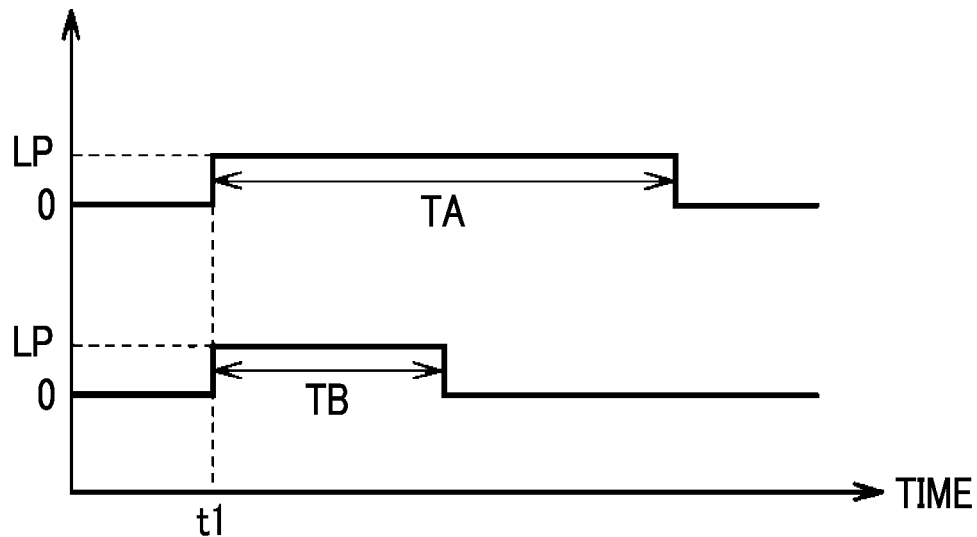
FIG. 7 is a diagram illustrating one example of low power output from each power transfer device in a pairing process.

FIG. 7 is a diagram illustrating one example of the low power output from each power transfer device in the pairing process. A power transfer device 100A and a power transfer device 100 are respectively disposed in two adjacent parking spaces.

In FIG. 7, when the pairing process is initiated at time t1, the power transfer device 100A outputs low power LP for a period TA that is specific to the power transfer device 100A. The power transfer device 100B outputs the low power LP for a period TB ($\neq$TA) that is specific to the power transfer device 100B. When the period of reception of the low power LP is equal in length to the period TA in the vehicle 200, the vehicle 200 is associated with the power transfer device 100A. When the period of reception of the low power LP is equal in length to the period TB in the vehicle 200, the vehicle 200 is associated with the power transfer device 100B.

Figure 8:
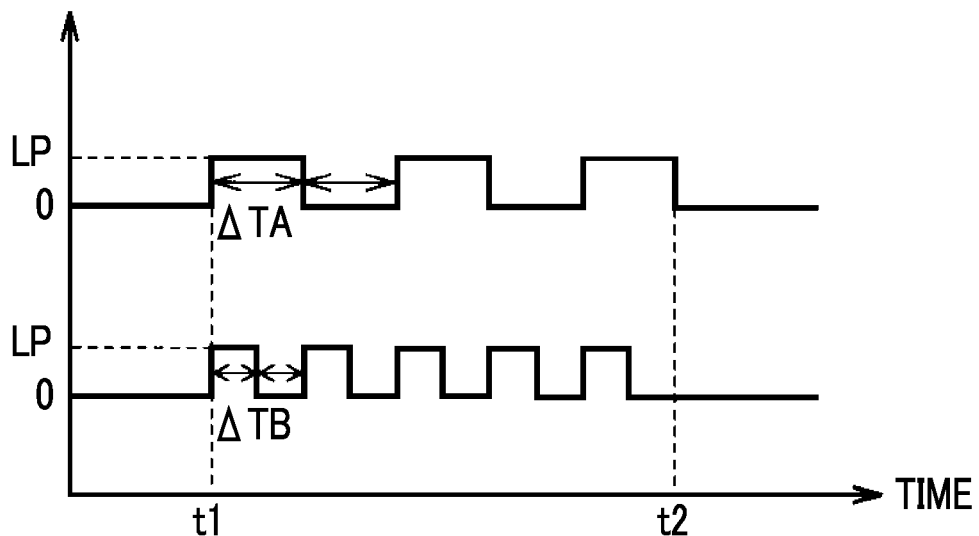
FIG. 8 is a diagram illustrating another example of low power output from each power transfer device in the pairing process.

FIG. 8 is a diagram illustrating another example of the low power output from each power transfer device in the pairing process. The power transfer device 100A and the power transfer device 100B are respectively disposed in two adjacent parking spaces.

In FIG. 8, when the pairing process is initiated at time t1, the power transfer device 100A outputs the low power LP in a pulse shape for a predetermined period from time t1 to time t2. Each of the ON period and the OFF period of the low power LP of the power transfer device 100A is equal in length to ΔTA that is specific to the power transfer device 100A. The power transfer device 100B outputs the low power LP in a pulse shape for a predetermined period from time t1 to time t2. Each of the ON period and the OFF period of the low power LP of the power transfer device 100B is equal in length to ΔTB (≠ΔTA) that is specific to the power transfer device 100B. When the ON period and the OFF period of the low power LP in a pulse shape are equal in length to ΔTA in the vehicle 200, the vehicle 200 is associated with the power transfer device 100A. When the ON period and the OFF period of the low power LP in a pulse shape are equal in length to ΔTB in the vehicle 200, the vehicle 200 is associated with the power transfer device 100B.

In FIG. 6, when the positioning process and the pairing process for the vehicle 200 with respect to the power transfer device 100 are completed (YES in step S10), the controller 170 determines whether or not the user provides an instruction to execute the initial learning of the foreign object detection sensor (the camera 120 and the foreign object detection coils 130) through the input part 140 (FIG. 1) (step S20). When an instruction to execute the initial learning is provided (YES in step S20), the controller 170 executes an initial learning process for a foreign object detection camera (camera 120) (step S30) and executes an initial learning process for the foreign object detection coils 130 (step S35). Each of the initial learning process for the camera 120 and the initial learning process for the foreign object detection coils 130 will be described below.

When the initial learning process for the camera 120 is executed in step S30 and when the initial learning process for the foreign object detection coils 130 is executed in step S35, the controller 170 determines whether or not both a normal camera initial learning flag indicating normal execution of the initial learning of the camera 120 and a normal coil initial learning flag indicating normal execution of the initial learning of the foreign object detection coils 130 are ON (step S40). The normal camera initial learning flag and the normal coil initial learning flag are respectively generated in the initial learning process for the camera 120 and the initial learning process for the foreign object detection coils 130.

When the controller 170 determines that at least one of the normal camera initial learning flag and the normal coil initial learning, flag is OFF (NO in step S40), the controller 170 controls the notification part 150 (FIG. 1) to notify the user that power is not allowed to be transferred to the power reception unit 210 from the power transfer unit 110 due to abnormal initial learning (step S70). The controller 170 does not allow power to be transferred to the power reception unit 210 from the power transfer unit 110 (step S90). The reason is because, as described above, when the initial learning is not normally executed, a foreign object that is present between the power transfer unit 110 and the power reception unit 210 may not be determined to be present.

When the controller 170 in step S40 determines that both of the normal camera initial learning flag and the normal coil initial learning flag are ON (YES in step S40), the controller 170 determines whether or not the difference between the result of the initial learning of the camera 120 (the captured image of the camera 120 in the absence of a foreign object) and the detection result of the camera 120 (the current captured image of the camera 120) is small (step S50). The difference (the magnitude of difference) between two images can be determined by using various known image processing methods.

When the controller 170 in step S50 determines that the difference between the result of the initial learning and the detection result (current captured image) is large (NO in step S50), the controller 170 determines whether or not a foreign object is present between the power transfer unit 110 and the power reception unit 210 (step S80). Then, the controller 170 transitions to the process of step S90 and does not allow power to be transferred to the power reception unit 210 from the power transfer unit 110.

When the controller 170 in step S50 determines that the difference between the result of the initial learning and the detection result (current captured image) is small (YES in step S50), the controller 170 determines whether or not the difference between the result of the initial learning of each foreign object detection coil 130 (the output voltage of each foreign object detection coil 130 in the absence of a foreign object) and the detection result of each foreign object detection coil 130 (the current output voltage of each foreign object detection coil 130) is small (step S55).

When the controller 170 in step S55 determines that the difference between the result of the initial learning and the detection result (current output voltage) is large (NO in step S55), the controller 170 transitions to the process of step S80 to determine whether or not a foreign object is present between the power transfer unit 110 and the power reception unit 210. Then, the controller 170 transitions to the process of step S90 and does not allow power to be transferred to the power reception unit 210 from the power transfer unit 110.

When the controller 170 in step S55 determines that the difference between the result of the initial learning and the detection result (current output voltage) is small (YES in step S55), the controller 170 allows power to be transferred to the power reception unit 210 from the power transfer unit 110 (step S60). Accordingly, a large amount of power for charging the power storage device 220 is transferred to the power reception unit 210 from the power transfer unit 110.

Figure 9:
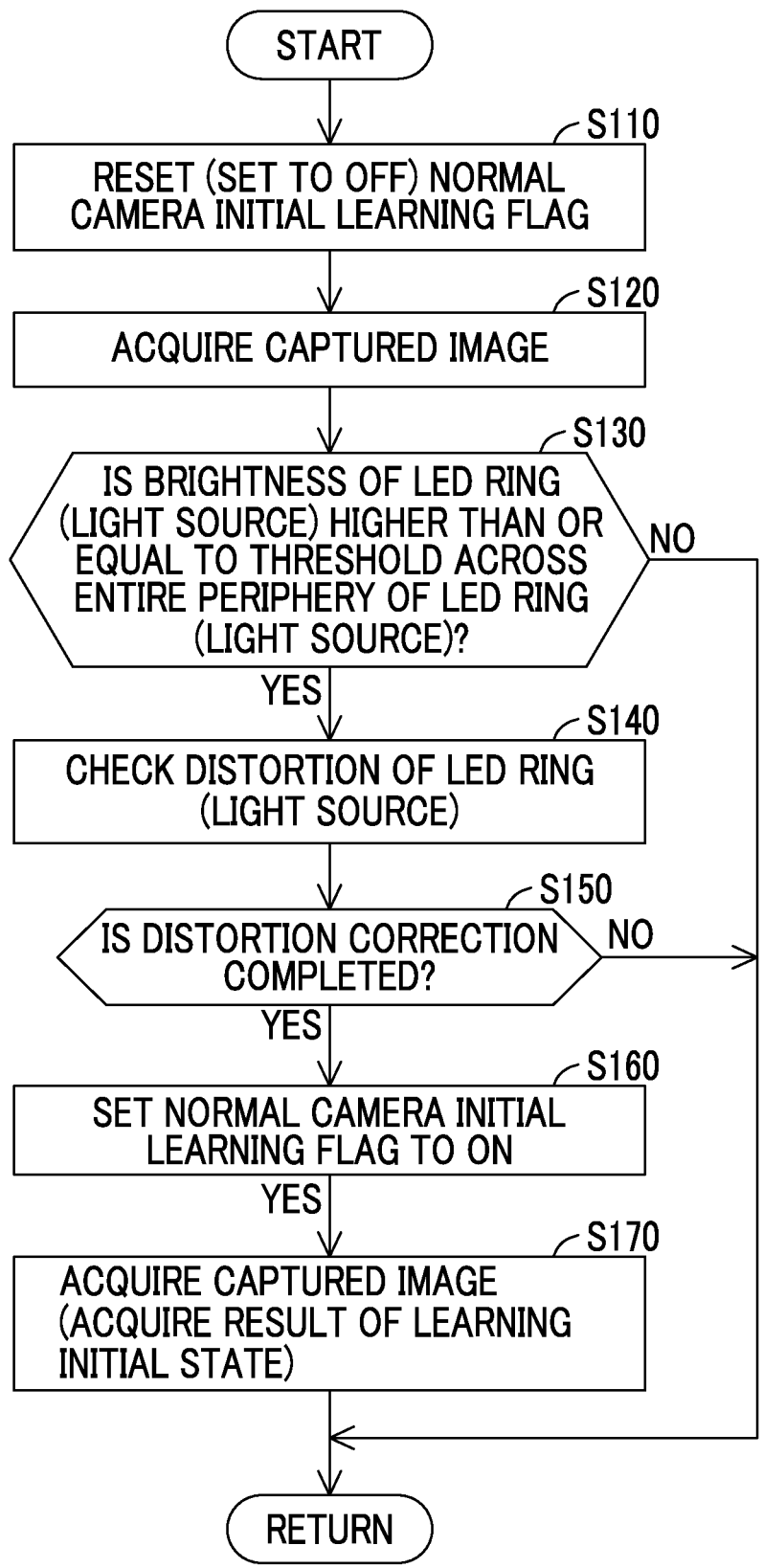
FIG. 9 is a flowchart illustrating an initial learning process for the foreign object detection camera executed in step S30 in FIG. 6.

FIG. 9 is a flowchart illustrating the initial learning process for the foreign object detection camera (camera 120) executed in step S30 in FIG. 6, in FIG. 9, first, the controller 170 resets (sets to OFF) the normal camera initial learning flag (step S110).

Next, the controller 170 acquires the captured image of the camera 120 by causing the light source 122 (FIG. 2 and FIG. 3) to emit light (step S120). The controller 170 determines whether or not the brightness of the LED ring of the light source 122 is higher than or equal to a threshold across the entire periphery of the LED ring, based on the acquired captured image (step S130). When there is a part of the LED ring where brightness is lower than the threshold (NO in step S130), a foreign object is determined to be present between the power transfer unit 110 and the power reception unit 210. Consequently, the initial learning of the camera 120 is not determined to be normally executed. Then, the controller 170 transitions to a return process without executing the subsequent processes. That is, the normal camera initial learning flag is not changed from OFF, and the initial learning process for the foreign object detection camera (camera 120) returns to the main routine in FIG. 6.

When the controller 170 in step S130 determines that the brightness of the LED ring is higher than or equal to the threshold across the entire periphery of the LED ring (YES in step S130), the controller 170 checks distortion of the LED ring (step S140). In the captured image of the camera 120, the LED ring is a part that appears in a ring shape along the outer periphery of the image. When a distortion is determined to occur in the part, distortion correction is executed to reduce the distortion. The distortion in the image captured by using a fisheye lens can be corrected by using various known methods.

When the distortion correction is not completed due to any abnormality (NO in step S150), for example, when the distortion correction is not completed even after a predetermined period elapses, the accuracy of foreign object detection performed by the camera 120 may not be secured. Thus, the initial learning of the camera 120 is not determined to be normally executed, and the controller 170 transitions to the return process without executing the subsequent processes. That is, in such a case as well, the normal camera initial learning flag is not changed from OFF, and the initial learning process for the foreign object detection camera (camera 120) returns to the main routine in FIG. 6.

When the controller 170 in step S150 determines that the distortion correction is completed (YES in step S150), the initial learning of the camera 120 is determined to be normally executed, and the controller 170 sets the normal camera initial learning flag to ON (step S160). The controller 170 acquires the captured image of the camera 120 again (step S170). The captured image acquired here is used in step S50 in FIG. 6 as a result of the initial learning (a result of learning the initial state) of the camera 120.

Figure 10:
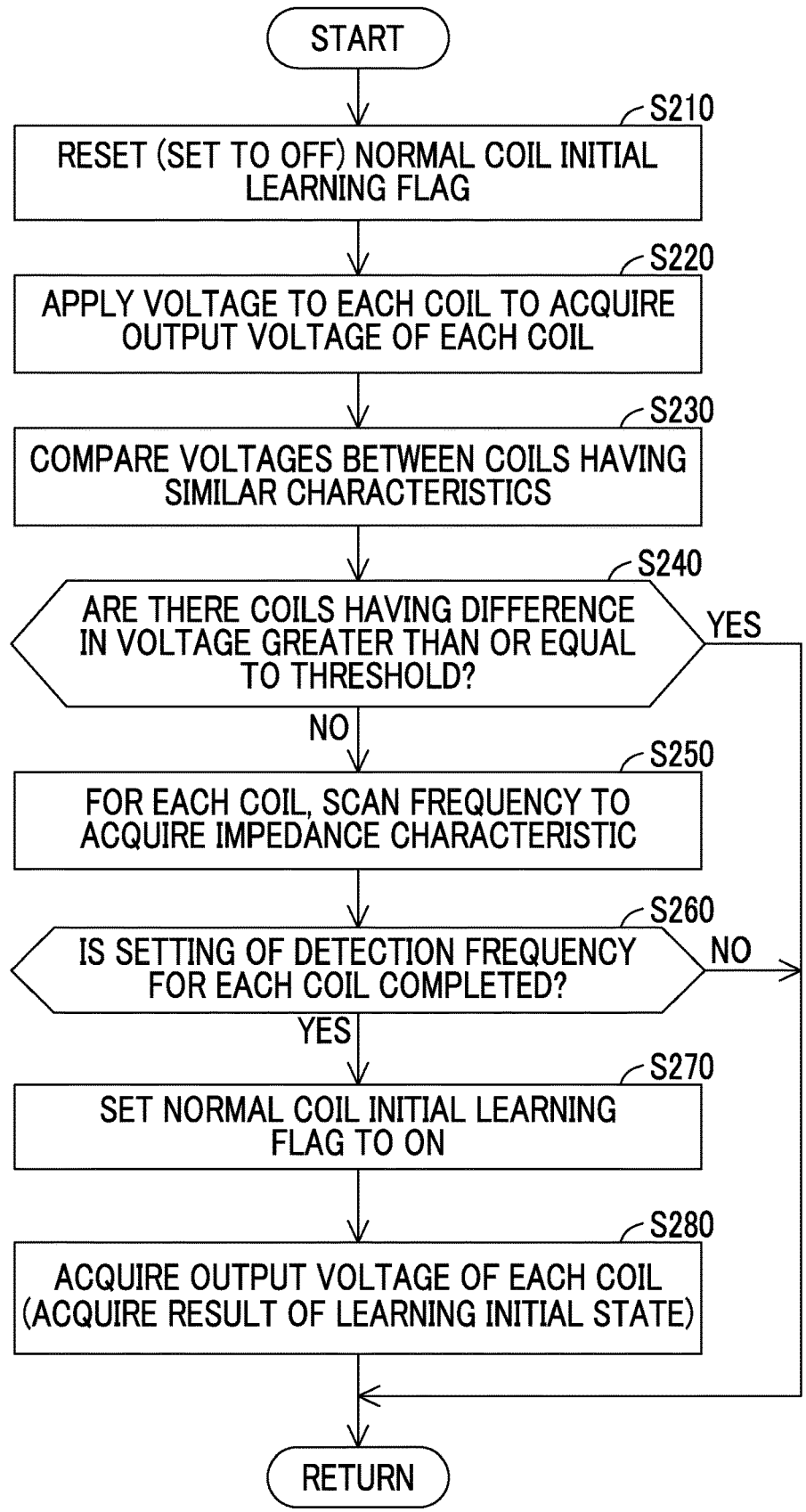
FIG. 10 is a flowchart illustrating an initial learning process for the foreign object detection coil executed in step S35 in FIG. 6.

FIG. 10 is a flowchart illustrating the initial learning process for the foreign object detection coils 130 executed in step S35 in FIG. 6. In FIG. 10, first, the controller 170 resets (sets to OFF) the normal coil initial learning flag (step S210).

Next, the controller 170 applies a predetermined voltage to each foreign object detection coil 130 to acquire the output voltage of each foreign object detection coil 130 (step S220). Specifically, the controller 170 applies a predetermined voltage to the first coil 468 of each foreign object detection coil 130 to acquire the output voltage of the second coil 478.

The controller 170 compares the output voltages of predetermined coils having similar characteristics among the foreign object detection coils 130 (step S230). The foreign object detection coils 130 are disposed in a matrix shape on the power transfer unit 110. The length of a wire to each foreign object detection coil 130 from a voltage generation part (not illustrated) that generates the voltage to be applied to each foreign object detection coil 130, and the length of a wire from each foreign object detection coil 130 to a detection part that detects the output voltage of each foreign object detection coil 130 differ depending on the position where each coil is disposed. Thus, even when the predetermined voltage is evenly applied to each foreign object detection coil 130, there is a difference in output between each foreign object detection coil 130 due to a difference in the lengths of the wires. Therefore, coils having a small difference in the lengths of the wires and having similar characteristics are grouped in advance.

When coils having a difference in output voltage that is greater than or equal to a predetermined threshold exist among the coils having similar characteristics (YES in step S240), the controller 170 transitions to the return process without executing the subsequent processes. That is, when coils having a difference in output voltage that is greater than or equal to the threshold exist among the coils having similar characteristics, a foreign object is determined to be present on the power transfer unit 110. Consequently, the initial learning of the foreign object detection coils 130 is not determined to be normally executed. Therefore, the normal coil initial learning flag is not changed from OFF, and the initial learning process for the foreign object detection coils 130 returns to the main routine in FIG. 6.

When the controller 170 in step S240 determines that coils having a difference in output voltage that is greater than or equal to the threshold do not exist among the coils having similar characteristics (NO in step S240), the controller 170 acquires an impedance characteristic of each foreign object detection coil 130 by scanning the frequency of the voltage (alternating current) to be applied to the foreign object detection coils 130 (step S250). The acquired impedance characteristic is used for setting a frequency that can secure a predetermined level of foreign object detection sensitivity in each foreign object detection coil 130.

When setting of a detection frequency for each foreign object detection coil 130 based on the acquired impedance characteristic is not completed (NO in step S260), for example, when a frequency that can secure the predetermined level of foreign object detection sensitivity does not exist, the accuracy of foreign object detection performed by the foreign object detection coils 130 cannot be secured. Thus, the initial learning of the foreign object detection coils 130 is not determined to be normally executed, and the controller 170 transitions to the return process without executing the subsequent processes. That is, in such a case as well, the normal coil initial learning flag is not changed from OFF, and the initial learning process for the foreign object detection coils 130 returns to the main routine in FIG. 6.

When the controller 170 in step S260 determines that setting of the detection frequency for each foreign object detection coil 130 is completed (YES in step S260), the initial learning of each foreign object detection coil 130 is determined to be normally executed, and the controller 170 sets the normal coil initial learning flag to ON (step S270). The controller 170 applies the predetermined voltage to each foreign object detection coil 130 to acquire the output voltage of each foreign object detection coil 130 again (step S280). The output voltage of each foreign object detection coil 130 acquired here is used in step S55 in FIG. 6 as the result of the initial learning (the result of learning the initial state) of each foreign object detection coil 130.

As described heretofore, the embodiment does not allow power to be transferred to the power reception unit 210 from the power transfer unit 110 when the initial learning is not normally executed for the camera 120 and the foreign object detection coils 130. Accordingly, the power transfer device 100 can reduce transfer of a large amount of power to the power reception unit 210 from the power transfer unit 110 without detection of a foreign object regardless of the presence of the foreign object between the power transfer unit 110 and the power reception unit 210. Therefore, the embodiment may reduce a rise in the temperature of the foreign object due to transfer of a large amount of power to the power reception unit 210 from the power transfer unit 110 without detection of the foreign object regardless of the presence of the foreign object.

The input part 140 that receives an instruction to execute the initial learning from the user is disposed in the embodiment. Thus, the embodiment can certainly reduce automatic execution of the initial learning regardless of the presence of the foreign object. That is, the initial learning can be executed after the user confirms that a foreign object is not present. Therefore, the embodiment can execute the initial learning in a situation where a foreign object is certainly not present.

The embodiment executes the initial learning after completion of the pairing process. Thus, even when low power is transferred for the pairing process, the embodiment may not allow power (a large amount of power) to be transferred to the power reception unit 210 from the power transfer unit 110 when the initial learning is not normally executed.

The notification part 150 is disposed in the embodiment. Thus, the user can understand the reason why power is not allowed to be transferred to the power reception unit 210 from the power transfer unit 110 (recognize that the initial learning, is not normally executed).

The embodiment does not allow power to be transferred to the power reception unit 210 from the power transfer unit 110 when the initial learning is not normally executed or when the foreign object detection sensor determines that a foreign object is present. However, instead of not allowing the power transfer, the power transfer may be restrained (for example, power transfer that is determined to affect the foreign object to a sufficiently small extent is allowed).

The embodiment executes the initial learning of the foreign object detection sensor (the camera 120 and the foreign object detection coils 130) after the positioning process and the pairing process for the vehicle 200 with respect to the power transfer device 100 are completed. However, the initial learning may be executed independently of the positioning process and the pairing process. For example, the initial learning may be executed immediately after the power transfer device 100 is powered up or while the power transfer device 100 is on standby where power is not transferred.

The embodiment executes foreign object detection by combining the camera 120 with the foreign object detection coils 130 in order to increase the capability to detect a foreign object. However, foreign object detection may be performed by using the camera 120, or foreign object detection may be performed by using the foreign object detection coils 130.

The embodiment disclosed here is for illustrative purposes from every point of view and is to be considered non-restrictive. All modifications made within an equivalent meaning and an equivalent scope of the claims are intended to fall within the disclosure.

What is claimed is:

1. A power transfer device comprising:
a power transfer part configured to contactles sly transfer power to a power reception part of a power reception device;
a sensor configured to detect a foreign object that is present between the power transfer part and the power reception part;
an input part configured to receive an instruction to execute an initial learning from a user; and
a controller configured to control the power transfer part and the sensor, wherein:
the controller is configured to, when the input part receives the instruction from the user, execute the initial learning that learns an initial state of a detection result of the sensor where the foreign object is not present between the power transfer part and the power reception part, before initiation of foreign object detection using the sensor;
the controller is configured to determine presence of the foreign object by using a difference between the initial state and the detection result of the sensor after execution of the initial learning; and
the controller is configured to control the power transfer part to reduce power to be transferred to the power reception part when the initial learning is not normally executed.

2. The power transfer device according to claim 1, wherein:
the power reception device is mounted in a vehicle; and
the controller is configured to execute the initial learning after completion of a pairing process that associates the vehicle with the power transfer device.

3. The power transfer device according to claim 1, further comprising a notification part configured to notify a user that the power to be transferred to the power reception part from the power transfer part is reduced due to a fact that the initial learning is not normally executed.

4. The power transfer device according to claim 1, wherein the controller is configured not to allow power to be transferred to the power reception part from the power transfer part when the initial learning is not normally executed.

5. The power transfer device according to claim 1, wherein the sensor includes at least one of a camera configured to capture a space between the power transfer part and the power reception part and an abnormality detection coil configured to output a different output voltage depending on the presence of the foreign object.

6. A power transfer system comprising:
a power transfer device; and
a power reception device, wherein:
the power transfer device includes
a power transfer part configured to contactlessly transfer power to a power reception part of the power reception device,
a sensor configured to detect a foreign object that is present between the power transfer part and the power reception part,
an input part configured to receive an instruction to execute an initial learning from a user, and
a controller configured to control the power transfer part and the sensor wherein:
the controller is configured to, when the input part receives the instruction from the user, execute the initial learning that learns an initial state of a detection result of the sensor where the foreign object is not present between the power transfer part and the power reception part, before initiation of foreign object detection using the sensor;
the controller is configured to determine presence of the foreign object by using a difference between the initial state and the detection result of the sensor after execution of the initial learning; and
the controller is configured to control the power transfer part to reduce power to be transferred to the power reception part when the initial learning is not normally executed.

\* \* \* \* \*

UNITED STATES PATENT AND TRADEMARK OFFICE
CERTIFICATE OF CORRECTION

PATENT NO. : 10,886,788 B2  
APPLICATION NO. : 15/808317  
DATED : January 5, 2021  
INVENTOR(S) : Takahiro Misawa Page 1 of 1

It is certified that error appears in the above-identified patent and that said Letters Patent is hereby corrected as shown below:

In the Specification

Column 1, Line 8, delete "2010-232394" and insert --2016-232394--, therefor.

Column 3, Line 58, after "arrow", insert --U--.

Column 4, Line 29, delete "oaf" and insert --of--, therefor.

In the Claims

Column 13, Line 46, Claim 1, delete "contactles sly" and insert --contactlessly--, therefor.

Column 14, Line 46, Claim 6, after "sensor", insert --,--.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*